United States Patent
Li et al.

(10) Patent No.: US 10,198,209 B2
(45) Date of Patent: Feb. 5, 2019

(54) MEMORY STORAGE RECYCLING

(71) Applicant: Lenovo (Beijing) Limited, Beijing (CN)

(72) Inventors: Zhigang Li, Beijing (CN); Xiaohui Xie, Beijing (CN); Honglei Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/087,301

(22) Filed: Mar. 31, 2016

(65) Prior Publication Data
US 2017/0147256 A1     May 25, 2017

(30) Foreign Application Priority Data
Nov. 23, 2015   (CN) .......................... 2015 1 0819020

(51) Int. Cl.
*G06F 3/06*     (2006.01)
*G06F 12/00*    (2006.01)

(52) U.S. Cl.
CPC ............ *G06F 3/0647* (2013.01); *G06F 3/061* (2013.01); *G06F 3/064* (2013.01); *G06F 3/0608* (2013.01); *G06F 3/0652* (2013.01); *G06F 3/0683* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 2011/0219168 A1* | 9/2011 | Stephens | G06F 12/0246 711/103 |
| 2012/0297123 A1* | 11/2012 | Cherubini | G06F 12/0246 711/103 |

FOREIGN PATENT DOCUMENTS

| | | |
|---|---|---|
| CN | 1815629 A | 8/2006 |
| CN | 102147767 A | 8/2011 |
| CN | 102841849 A | 12/2012 |

OTHER PUBLICATIONS

Denition of term Current by Google 2018.*
Definition of term Cost by Google 2018.*
Defntion of term Global by Google 2018.*
Definition of term Parameter by Dictionary.com 2018.*
Defntion of Cosine by Math is Fun 2017.*

* cited by examiner

*Primary Examiner* — Tuan V Thai
(74) *Attorney, Agent, or Firm* — Ference & Associaes LLC (57) ABSTRACT

One embodiment provides a device, including a processor; a plurality of storage units operatively coupled to the processor; and a memory device that stores instructions executable by the processor to: determine a first storage unit from the plurality of storage units; select at least one second storage unit from among the remaining other storage units that comprises a parameter that satisfies a predetermined condition, the predetermined condition being related to the first storage unit; transfer data from at least one of the first and second storage units to at least one the remaining other first and second storage units; and delete data from said at least one of the first and second storage units from which the data was transferred. Other aspects are described and claimed.

12 Claims, 5 Drawing Sheets

MEMORY STORAGE RECYCLING

CLAIM FOR PRIORITY

This application claims priority to Chinese Application No. 201510819020.6, filed on Nov. 23, 2015, which is fully incorporated by reference herein.

FIELD

The subject matter described herein relates to a control technology, and more specifically, to recycling memory storage in a solid-state device.

BACKGROUND

Hard disks are typically classified into mechanical hard disks HDD and solid-state hard disks SSD. A mechanical hard disk is a common traditional hard disk which supports overwriting, and thus the deleted data, if marked, may be readily recovered before they are covered by new data. While a solid-state hard disk is formed of an array of solid-state electronic storage chips, and composed of control units and storage units, it does not support overwriting, and must be erased in advance. This is known as trash recycling. Data recycling is primarily recycling with respect to suitable blocks selected from blocks comprising invalid data, wherein the blocks reside in a memory bank. The memory bank comprises multiple blocks, and each block comprises multiple pages. The valid data is stored in an update block, and the data in the original block can be erased to increase the number of empty blocks to achieve the objective of releasing usable spaces in order to have sufficient blocks for use in data writing.

Currently, the commonly used method is: taking into overall consideration of the number of erasing times, write times, and the number of valid pages, secondly, defining a loss function, and finally, taking the block with the maximum value of the loss function as the block for use in data recycling, that is, the storage unit for data recycling. However, since only one block can be selected for data recycling each time in the data recycling process, it results in resource wasting, increased data recycling numbers, and decreased efficiency.

BRIEF SUMMARY

In summary, one aspect provides a device, comprising: a processor; a plurality of storage units operatively coupled to the processor; and a memory device that stores instructions executable by the processor to: determine a first storage unit from the plurality of storage units; select at least one second storage unit from among the remaining other storage units that comprises a parameter that satisfies a predetermined condition, the predetermined condition being related to the first storage unit; transfer data from at least one of the first and second storage units to at least one the remaining other first and second storage units; and delete data from said at least one of the first and second storage units from which the data was transferred.

Another aspect provides a method, comprising: determining, using a processor, a first storage unit from a plurality of storage units of a memory device; selecting, using a processor, at least one second storage unit among the remaining other storage units that comprises a parameter that satisfies a predetermined condition, the predetermined condition being related to the first storage unit; transferring, using a processor, data from at least one of the first and second storage units to at least one of the remaining other first and second storage units; and deleting the transferred data from said at least one of the first and second storage units.

A further aspect provides a system, comprising: a first acquisition unit; an identification unit operatively coupled to the first acquisition unit; a second acquisition unit operatively coupled to the identification unit; a process unit operatively coupled to the second acquisition unit; and wherein: the first acquisition unit acquires first state parameters of a plurality of storage units in a storage device; the identification unit identifies a first storage unit from the plurality of storage units based on the first state parameters; the second acquisition unit acquires at least one second storage unit that satisfies a first predetermined condition, in relation to the first storage unit from the storage unit; and the process unit processes the data in the first storage unit and the data in the at least one second storage unit when a second predetermined condition is satisfied.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Figure 1:
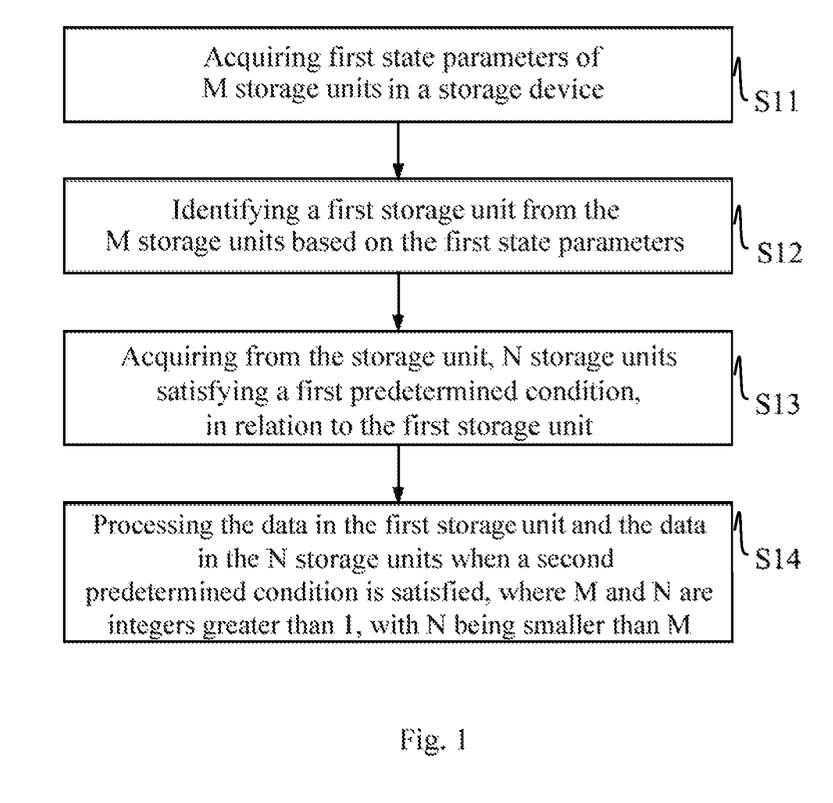
FIG. 1 is a flow chart of the method for recycling memory storage in a storage device disclosed in an embodiment.

An embodiment discloses a method for recycling memory in a storage device, and the flow chart of the method is shown in FIG. 1. The method includes, at S11, acquiring first state parameters for M storage units in a storage device. The storage device comprises a plurality of storage units which number can be designated as M, an integer being greater than 1.

At S12, the method includes identifying a first storage unit from the M storage units based on the first state parameters. In particular, the first state parameters may be lost function values, and the first storage unit is identified according to the lost function values of the M storage units. Where, in particular, the storage units in the storage device may be data blocks comprising page data, with the data block being the smallest erasable unit, and the page data being the smallest writable unit. Then, in particular, the loss function cost is as below:

$$\text{cost} = \frac{(globalWrite - blockWrite)}{blockErase} * \frac{GlobalValidPages}{BlockValidPages},$$

wherein globalWrite is the number of writes in the storage, blockWrite is the number of current writes, blockErase is the number of current erases, GlobalValidPages is the number of valid pages in the storage device, and BlockValidPages is the number of current valid pages.

At S13, the method includes acquiring N storage units, satisfying a first predetermined condition, in relation to the first storage unit from the storage unit. In particular, acquiring from the storage units the N storage units, with the second state parameters thereof being within a first range of difference from the second state parameters of the first storage unit; alternatively, acquiring the second state parameters of the N storage units, with the N storage units being from the storage units and like the first storage unit, satisfying the first predetermined condition. Wherein, the second state parameters represent the hash value for each storage unit.

Each storage unit, that is, the page data of a data block is subjected to hash to generate a hash value corresponding to the page data, and in turn to obtain the hash value of each storage unit, that is, the second state parameter. Then a plurality of storage units having hash values within the first range of difference from the hash value of the first storage unit will be searched out from the M storage units, and the plurality of storage units can be, in particular, N storage units, where N being an integer greater than 1, and smaller than M.

At S14, the method includes processing the data in the first storage unit and the data in the N storage units when a second predetermined condition is satisfied, wherein M and N are integers greater than 1, with N being smaller than M. In particular, processing the data in the first storage unit and the data in the N storage units may be: performing data recycling with respect to the data in the first storage unit and the data in the N storage units.

In particular, it may be storing the data in the first storage unit respectively into the N storage units, and then purging the data in the first storage unit to make the first storage unit an empty storage unit; alternatively, it may be selecting one or more storage units from the N storage units, and storing the data in the selected storage units respectively into other storage units, and then purging the data in the selected storage units to make the selected storage units empty storage units for subsequent data storage.

The method for recycling memory in a storage device disclosed in this embodiment can be applied in a solid-state hard disk. By acquiring the first state parameters of the M storage units in the storage device, determining the first storage unit from the M storage units based on the first state parameters; acquiring from the storage units the N storage units, like the first storage unit, satisfying the first predetermined condition; processing the data in the first storage unit and the data in the N storage units when the second predetermined condition is satisfied, wherein M and N are integers greater than 1, with N being smaller than M. This solution achieves data processing in the first storage unit and the data in the N storage units and data recycling of a plurality of storage units by selecting from the storage units the N storage units, like the first storage unit, satisfying the first predetermined condition, thereby increasing the recycling efficiency, reducing the number of times data is recycled in the storage device, and thus avoiding waste of resources.

Figure 2:
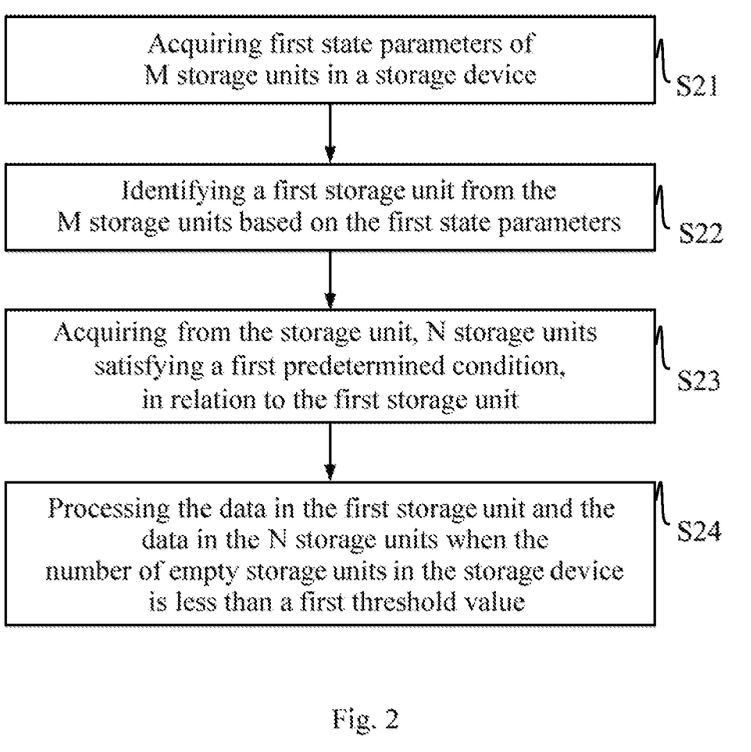
FIG. 2 is a flow chart of the method for recycling memory storage in a storage device disclosed in an embodiment.

This embodiment discloses a method for recycling memory in a storage device, and the flow chart of the method is shown in FIG. 2. The method includes, at S21, acquiring first state parameters for M storage units in a storage device. The storage device comprises a plurality of storage units which number can be designated as M, an integer being greater than 1.

At S22, the method includes identifying a first storage unit from the M storage units based on the first state parameters. In particular, the first state parameters may be lost function values, and the first storage unit is identified according to the lost function values of the M storage units. Where, in particular, the storage units in the storage device may be data blocks comprising page data, with the data block being the smallest erasable unit, and the page data being the smallest writable unit. Then, in particular, the loss function cost is as below:

$$\text{cost} = \frac{(globalWrite - blockWrite)}{blockErase} * \frac{GlobalValidPages}{BlockValidPages},$$

wherein globalWrite is the number of writes in the storage, blockWrite is the number of current writes, blockErase is the number of current erases, GlobalValidPages is the number of valid pages in the storage device, and BlockValidPages is the number of current valid pages.

At S23, the method includes acquiring N storage units, satisfying a first predetermined condition, in relation to the first storage unit from the storage unit. In particular, acquiring from the storage units the N storage units, with the second state parameters thereof being within a first range of difference from the second state parameters of the first storage unit. Alternatively, acquiring the second state parameters of the N storage units, with the N storage units being from the storage units and like the first storage unit, satisfying the first predetermined condition. Wherein, the second state parameters represent the hash value for each storage unit.

Each storage unit, that is, the page data of a data block is subjected to hash to generate a hash value corresponding to the page data, and in turn to obtain the hash value of each storage unit, that is, the second state parameter. Then a plurality of storage units having hash values within the first range of difference from the hash value of the first storage unit will be searched out from the M storage units, and the plurality of storage units can be, in particular, N storage units, where N being an integer greater than 1, and smaller than M.

At S24, the method includes processing the data in the first storage unit and the data in the N storage units when the number of empty storage units in the storage device is less than a first threshold value. In the above, M and N are integers greater than 1, with N being smaller than M. Performing data recycling in the storage units when it is detected that the number of empty storage units in the storage device for use in subsequent storing of other data is relatively small. Furthermore, it may also be: upon receiving a start command of a user, performing data recycling in the storage units according to the start command to ensure that the storage is always in a state of having empty storage units. In particular, processing the data in the first storage unit and the data in the N storage units may be: performing data recycling with respect to the data in the first storage unit and the data in the N storage units.

In particular, it may be storing the data in the first storage unit respectively into the N storage units, and then purging the data in the first storage unit to make the first storage unit an empty storage unit. Alternatively, it may be selecting one or more storage units from the N storage units, and storing the data in the selected storage units respectively into other storage units, and then purging the data in the selected storage units to make the selected storage units empty storage units for subsequent data storage.

The method for recycling memory in a storage device disclosed in this embodiment can be applied in a solid-state hard disk. By acquiring the first state parameters of the M storage units in the storage device, determining the first storage unit from the M storage units based on the first state parameters; acquiring from the storage units the N storage units, like the first storage unit, satisfying the first predetermined condition; processing the data in the first storage unit and the data in the N storage units when the second predetermined condition is satisfied, wherein M and N are integers greater than 1, with N being smaller than M. This solution achieves data processing in the first storage unit and the data in the N storage units and data recycling of a plurality of storage units by selecting from the storage units the N storage units, like the first storage unit, satisfying the first predetermined condition, thereby increasing the recycling efficiency, reducing the number of times data is recycled in the storage device, and thus avoiding waste of resources.

Figure 3:
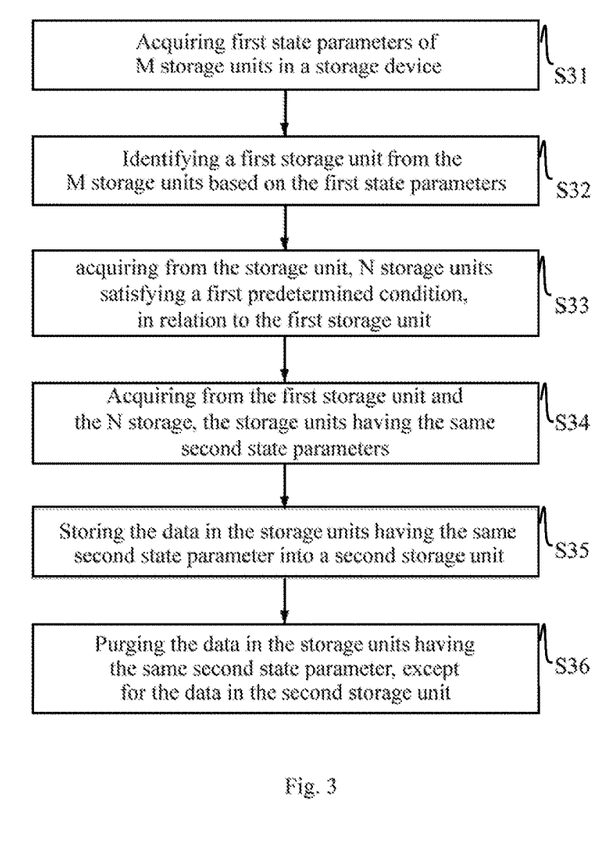
FIG. 3 is a flow chart of the method for recycling memory storage in a storage device disclosed in an embodiment.

This embodiment discloses a method for recycling memory in a storage device, and the flow chart of the method is shown in FIG. 3. The method includes, at S31, acquiring first state parameters for M storage units in a storage device. The storage device comprises a plurality of storage units which number can be designated as M, an integer being greater than 1.

At S32, the method includes identifying a first storage unit from the M storage units based on the first state parameters. In particular, the first state parameters may be lost function values, and the first storage unit is identified according to the lost function values of the M storage units. In particular, in this embodiment, the storage units in the storage device may be data blocks comprising page data, with the data block being the smallest erasable unit, and the page data being the smallest writable unit.

At S33, the method includes acquiring N storage units, satisfying a first predetermined condition, in relation to the first storage unit from the storage unit. In particular, acquiring from the storage units the N storage units, with the second state parameters thereof being within a first range of difference from the second state parameters of the first storage unit. Alternatively, the method includes acquiring the second state parameters of the N storage units, with the N storage units being from the storage units and like the first storage unit, satisfying the first predetermined condition, where the first predetermined condition may be: within a first range of difference from the second state parameters of the first storage unit.

At S34, the method includes acquiring the storage units having the same second state parameters from the first storage unit and the N storage. In the above, M and N are integers greater than 1, with N being smaller than M. Performing data recycling in the storage units when it is detected that the number of empty storage units in the storage device for use in subsequent storing of other data is relatively small.

The N storage units acquired in the step described above are merely those having the second state parameters within a first range of difference from the second state parameters of the first storage unit, that is, the second state parameters of the N storage units are close to, or the same with the second state parameters of the first storage unit. Search out the storage units having the same second state parameters from the number N+1 storage units. The storage units having the same second state parameters may be: a third storage unit, a fourth storage unit and a fifth storage unit; alternatively, they may be: a first storage unit, a fourth storage unit, a fifth storage unit and a sixth storage unit.

In the number N+1 storage units, there may be one group of storage units having the same second state parameter, for example, only the third storage unit and the fourth storage unit have the same second state parameter, or only the first storage unit, the fourth storage unit and the fifth storage unit have the same second state parameter; alternatively, there may be two groups of storage units having same second state parameters, for example, the third storage unit and the fourth storage unit have the same second state parameter, and additionally, the first storage unit, the fourth storage unit and the fifth storage unit also have the same second state parameter; however, the particular values of the second state parameters are different, and will not be defined specifically herein.

At S35, the method includes storing the data in the storage units having the same second state parameters into a second storage unit. If there is only one group of storage units having the same second state parameter, for example, the first storage unit, the fourth storage unit and the fifth storage unit have the same second state parameter, then the data in the first storage unit and the fourth storage unit can be stored completely into the fifth storage unit; or, the data in the first storage unit and the fifth storage unit can be stored completely into the fourth storage unit. Alternatively, the data in the first storage unit, the fourth storage unit and the fifth storage unit can be stored completely into an empty storage unit, and this storage unit storing the data is defined as a second storage unit.

If there are two or more groups of storage units having same second state parameters, then the data in the storage units having the same second state parameters can be stored respectively into a storage device unit. Furthermore, as the data in the first storage unit, the fourth storage unit and the fifth storage unit is stored completely into an empty storage unit, or the data in the first storage unit and the fifth storage unit is stored completely into the fourth storage unit, the mapping table needs to be updated. That is, the process of data transfer that the data in the first storage unit is stored into the fourth storage unit must be reflected in the mapping table to facilitate retrieval of the data.

At S36, the method includes purging the data in the storage units having the same second state parameter, except for the data in the second storage unit. If the storage units having the same second state parameters are the first storage unit, the fourth storage unit and the fifth storage unit, and the data in the first storage unit and the data in the fourth storage unit are stored completely into the fifth storage unit, then the data in the first storage unit and the data in the fourth storage unit are deleted completely and the first storage unit and the fourth storage unit become new empty storage units. If the data in the first storage unit, the data in the fourth storage unit and the data in the fifth storage unit are stored completely into an empty storage unit, then the data in the first storage unit, the data in the fourth storage unit and the data in the fifth storage unit are deleted completely and the first storage unit, the fourth storage unit and the fifth storage unit become totally new empty storage units. If there are multiple groups of storage units having same second state parameters, then with this step, a plurality of empty storage units can be obtained.

The method for recycling memory in a storage device disclosed in this embodiment can be applied in a solid-state hard disk. By acquiring the first state parameters of the M storage units in the storage device, determining the first storage unit from the M storage units based on the first state parameters; acquiring from the storage units the N storage units, like the first storage unit, satisfying the first predetermined condition; processing the data in the first storage unit and the data in the N storage units when the second predetermined condition is satisfied, wherein M and N are integers greater than 1, with N being smaller than M. This solution achieves data processing in the first storage unit and the data in the N storage units and data recycling of a plurality of storage units by selecting from the storage units the N storage units, like the first storage unit, satisfying the first predetermined condition, thereby increasing the recycling efficiency, reducing the number of times data is recycled in the storage device, and thus avoiding waste of resources.

Figure 4:
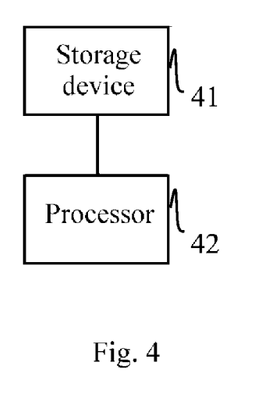
FIG. 4 is a schematic diagram of the structure of the device for recycling memory storage in a storage device disclosed in an embodiment.

This embodiment discloses a device for recycling memory in a storage device, and its structure schematic diagram is shown in FIG. 4. The device includes a storage device 41, and a processor 42 connected to the storage device 41. Wherein, the storage device 41 comprises M storage units.

The processor 42 is configured for acquiring the first state parameters of M storage units in the storage device 41, and then identifying the first storage unit from the M storage units based on the first state parameters, and acquiring from the storage units the N storage units, like the first storage unit, satisfying the first predetermined condition; and when a second predetermined condition is satisfied, processing the data in the first storage unit and the data in the N storage units, wherein M and N are integers greater than 1, with N being smaller than M.

The first state parameters may be lost function values, and the first storage unit is identified according to the lost function values of the M storage units.

Where, in particular, the storage units in the storage device may be data blocks comprising page data, with the data block being the smallest erasable unit, and the page data being the smallest writable unit. Then, in particular, the loss function cost is as below:

$$\text{cost} = \frac{(globalWrite - blockWrite)}{blockErase} * \frac{GlobalValidPages}{BlockValidPages},$$

wherein globalWrite is the number of writes in the storage, blockWrite is the number of the current writes, blockErase is the number of current erases, GlobalValidPages is the number of valid pages in the storage device, and BlockValidPages is the number of current valid pages.

In particular, acquiring from the storage units the N storage units, like the first storage unit, satisfying the first predetermined condition: acquiring from the storage units the N storage units which the second state parameters thereof being within a first range of difference from the second state parameters of the first storage unit. Alternatively, the method includes acquiring the second state parameters of the N storage units, with the N storage units being from the storage units and like the first storage unit, satisfying the first predetermined condition. Wherein, the second state parameters represent the hash value for each storage unit.

Each storage unit, that is, the page data of a data block is subjected to hash to generate a hash value corresponding to the page data, and in turn to obtain the hash value of each storage unit, that is, the second state parameter. Then a plurality of storage units having hash values within the first range of difference from the hash value of the first storage unit will be searched out from the M storage units, and the plurality of storage units can be, in particular, N storage units, where N being an integer greater than 1, and smaller than M.

When the second predetermined condition is satisfied, the processor 42 will process the data in the first storage unit and the data in the N storage units. In particular, when the number of empty storage units in the storage device is less than a first threshold value, the processor will perform data recycling with respect to the data in the first storage unit and the data in the N storage units; alternatively, upon receiving, by the processor, a start command, the processor will process the data in the first storage unit and the data in the N storage units.

In particular, it may be storing the data in the first storage unit respectively into the N storage units, and then purging the data in the first storage unit to make the first storage unit an empty storage unit. Alternatively, it may be selecting one or more storage units from the N storage units, and storing the data in the selected storage units respectively into other storage units, and then purging the data in the selected storage units to make the selected storage units empty storage units for subsequent data storage.

In particular, it may be storing the data in the first storage unit respectively into the N storage units, and then purging the data in the first storage unit to make the first storage unit an empty storage unit. Alternatively, it may be selecting one or more storage units from the N storage units, and storing the data in the selected storage units respectively into other storage units, and then purging the data in the selected storage units to make the selected storage units empty storage units for subsequent data storage.

The processor 42 acquires from the first storage unit and the N storage units the storage units having the same second state parameter, stores the data in the storage units having the same second state parameters into a second storage unit, and purges the data in the storage units having the same second state parameter, except for the data in the second storage unit.

Wherein, the N storage units acquired by the processor are merely those having the second state parameters within a first range of difference from the second state parameters of the first storage unit, that is, the second state parameters of the N storage units are close to, or the same with the second state parameters of the first storage unit. Search out the storage units having the same second state parameters from the number N+1 storage units.

The storage units having the same second state parameters may be: a third storage unit, a fourth storage unit and a fifth storage unit; alternatively, they may be: a first storage unit, a fourth storage unit, a fifth storage unit and a sixth storage unit.

In the number N+1 storage units, there may be one group of storage units having the same second state parameter, for example, only the third storage unit and the fourth storage unit have the same second state parameter, or only the first storage unit, the fourth storage unit and the fifth storage unit have the same second state parameter. Alternatively, there may be two groups of storage units having same second state parameters, for example, the third storage unit and the fourth storage unit have the same second state parameter, and additionally, the first storage unit, the fourth storage unit and the fifth storage unit also have the same second state parameter; however, the particular values of the second state parameters are different, and will not be defined specifically herein.

If there is only one group of storage units having the same second state parameter, for example, the first storage unit, the fourth storage unit and the fifth storage unit have the same second state parameter, then the data in the first storage unit and the data in the fourth storage unit can be stored completely into the fifth storage unit; or, the data in the first storage unit and the data in the fifth storage unit can be stored completely into the fourth storage unit. Alternatively, the data in the first storage unit, the data in the fourth storage unit and the data in the fifth storage unit can be stored completely into an empty storage unit, and this storage unit storing the data is defined as a second storage unit.

If there are two or more groups of storage units having same second state parameters, then the data in the storage units having the same second state parameters can be stored respectively into a storage device unit.

Furthermore, as the data in the first storage unit, the data in the fourth storage unit and the data in the fifth storage unit are stored completely into an empty storage unit, or the data in the first storage unit and the data in the fifth storage unit are stored completely into the fourth storage unit, the mapping table needs to be updated, that is, the process of data transfer that the data in the first storage unit is stored into the fourth storage unit must be reflected in the mapping table to facilitate retrieval of the data.

If the storage units having the same second state parameters are: the first storage unit, the fourth storage unit and the fifth storage unit, and the data in the first storage unit and the data in the fourth storage is stored completely into the fifth storage unit, then the data in the first storage unit and the data in the fourth storage are deleted completely and the first storage unit and the fourth storage unit become new empty storage units. Where the data in the first storage unit, the data in the fourth storage unit and the data in the fifth storage unit are stored completely into an empty storage unit, then the data in the first storage unit, the data in the fourth storage unit and the data in the fifth storage unit are deleted completely and the first storage unit, the fourth storage unit and the fifth storage unit become totally new empty storage units.

If there are multiple groups of storage units having same second state parameters, then with this step, a plurality of empty storage units can be obtained.

The device for recycling memory in a storage device disclosed in this embodiment can be applied in a solid-state hard disk. The processor, by acquiring the first state parameters of the M storage units in the storage device, can determine the first storage unit from the M storage units based on the first state parameters, acquire from the storage units the N storage units, like the first storage unit, satisfying the first predetermined condition, and process the data in the first storage unit and the data in the N storage units when the second predetermined condition is satisfied, wherein M and N are integers greater than 1, with N being smaller than M. This solution achieves data processing in the first storage unit and the data in the N storage units and data recycling of a plurality of storage units by selecting from the storage units the N storage units, like the first storage unit, satisfying the first predetermined condition, thereby increasing the recycling efficiency, reducing the number of times data is recycled in the storage device, and thus avoiding waste of resources.

Figure 5:
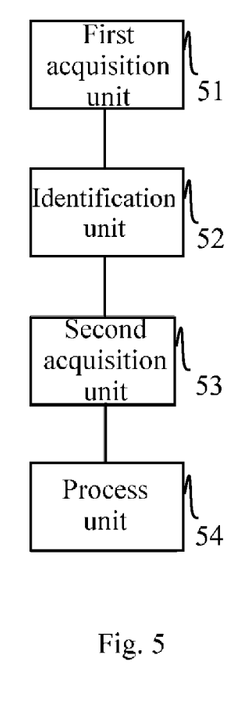
FIG. 5 is a schematic diagram of the structure of the system for recycling memory storage in a storage device disclosed in an embodiment.

This embodiment discloses a system for recycling memory in a storage device, and the structure schematic diagram of the system is shown in FIG. 5. The system includes a first acquisition unit 51, an identification unit 52 connected to the first acquisition unit 51, a second acquisition unit 53 connected to the identification unit 52, and a process unit 54 connected to the second acquisition unit 53. Wherein, the first acquisition unit 51 is configured for acquiring first state parameters for M storage units in a storage device. The storage device comprises a plurality of storage units which number can be designated as M, an integer being greater than 1.

The identification unit 52 is configured for identifying a first storage unit from the M storage units based on the first state parameters. In particular, the first state parameters may be lost function values, and the first storage unit is identified according to the lost function values of the M storage units. Where, in particular, the storage units in the storage device may be data blocks comprising page data, with the data block being the smallest erasable unit, and the page data being the smallest writable unit. Then, in particular, the loss function cost is as below:

$$\text{cost} = \frac{(globalWrite - blockWrite)}{blockErase} * \frac{GlobalValidPages}{BlockValidPages},$$

wherein globalWrite is the number of writes in the storage, blockWrite is the number of the current writes, blockErase is the number of current erases, GlobalValidPages is the number of valid pages in the storage device, and BlockValidPages is the number of current valid pages.

The second acquisition unit 53 is configured for acquiring N storage units, satisfying a first predetermined condition, in relation to the first storage unit from the storage unit. In particular, acquiring from the storage units the N storage units, with the second state parameters thereof being within a first range of difference from the second state parameters of the first storage unit. Alternatively, acquiring the second state parameters of the N storage units, with the N storage units being from the storage units and like the first storage unit, satisfying the first predetermined condition. Wherein, the second state parameters represent the hash value for each storage unit.

Each storage unit, that is, the page data of a data block is subjected to hash to generate a hash value corresponding to the page data, and in turn to obtain the hash value of each storage unit, that is, the second state parameter. Then a plurality of storage units having hash values within the first range of difference from the hash value of the first storage unit will be searched out from the M storage units, and the plurality of storage units can be, in particular, N storage units, where N being an integer greater than 1, and smaller than M.

The process unit 54 is configured for processing the data in the first storage unit and the data in the N storage units when a second predetermined condition is satisfied, wherein M and N are integers greater than 1, with N being smaller than M. In particular, processing the data in the first storage unit and the data in the N storage units may be: performing data recycling with respect to the data in the first storage unit and the data in the N storage units.

In particular, it may be storing the data in the first storage unit respectively into the N storage units, and then purging the data in the first storage unit to make the first storage unit an empty storage unit. Alternatively, it may be selecting one or more storage units from the N storage units, and storing the data in the selected storage units respectively into other storage units, and then purging the data in the selected storage units to make the selected storage units empty storage units for subsequent data storage.

The system for recycling memory in a storage device disclosed in this embodiment can be applied in a solid-state hard disk. By acquiring, with the first acquisition unit, the first state parameters of the M storage units in the storage device, determining, with the identification unit, the first storage unit from the M storage units based on the first state parameters; acquiring, with the second acquisition unit, from the storage units the N storage units, like the first storage unit, satisfying the first predetermined condition; processing, with the process unit, the data in the first storage unit and the data in the N storage units when the second predetermined condition is satisfied, wherein M and N are integers greater than 1, with N being smaller than M. This solution achieves data processing in the first storage unit and the data in the N storage units and data recycling of a plurality of storage units by selecting from the storage units the N storage units, like the first storage unit, satisfying the first predetermined condition, thereby increasing the recycling efficiency, reducing the number of times data is recycled in the storage device, and thus avoiding waste of resources.

Each embodiment disclosed herein is described in a progressive manner, and highlights its differences from other embodiments. For the identical or similar part of the embodiments, references can be made with each other. With respect to the device disclosed in the embodiment, since it corresponds to the method embodiment described herein, the description thereof is relatively simple, and for the relevant parts, a reference can be made to the description of the method.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith. In the context of this document, a readable medium is not a signal and "non-transitory" includes all media except signal media.

Embodiments are described with reference to flow charts and/or block diagrams of methods, devices (systems), and computer program products according to various example embodiments. It should be understood that, each process and/or block in the flow charts and/or block diagrams and a combination of processes and/or blocks in the flow charts and/or block diagrams may be implemented by using computer program instructions. The computer program instructions may be provided to a general computer, a dedicated computer, an embedded processor, or a processor of another programmable data processing device to generate a machine, so that the instructions executed by the computer or the processor of other programmable data processing device generates an apparatus configured to implement functions designated in one or more processes in the flow charts and/or one or more blocks in the block diagrams.

The computer program instructions may also be stored in a computer readable memory that can guide the computer or other programmable data processing device to work in a specific manner, so that the instruction stored in the computer readable memory generates a product including an instruction apparatus, and the instruction apparatus implements functions designated in one or more processes in the flow charts and/or one or more blocks in the block diagrams.

The computer program instructions may also be loaded to the computer or other programmable data processing devices, so that a series of operational steps are executed on the computer or other programmable devices to generate computer implemented processing, and therefore, instructions executed on the computer or other programmable devices provide steps used to implement functions designated in one or more processes in the flow charts and/or one or more blocks in the block diagrams.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:
1. A device, comprising:
a processor;
a plurality of storage units operatively coupled to the processor; and
a memory device that stores instructions executable by the processor to:

determine a first storage unit from the plurality of storage units based on computing a parameter for each of the plurality of storage units;

generate a hash value for each of the plurality of storage units;

select at least one second storage unit from the plurality of storage units, wherein the at least one second storage unit comprises at least one storage unit, from the plurality of storage units not including the first storage unit, satisfying a first predetermined condition, wherein the first predetermined condition comprises a difference between the hash value of the respective storage unit and the hash value of the first storage unit being within a predetermined range;

transfer data from the first storage unit to one of the at least one second storage units when a second predetermined condition is met, wherein the second condition comprises a number of empty storage units of the first storage unit being less than a threshold value; and delete the data from the first storage unit.

2. The device according to claim 1, comprising acquiring second state parameters, by the processor, of N storage units, with the N storage units being at least one second storage unit and like satisfies the first predetermined condition.

3. The device according to claim 1, comprising processing the data in the first storage unit and the data in the second storage unit.

4. The device according to claim 1, wherein the instructions are further executable by the processor to:

acquire data from the first storage units having the same second state parameters;

store the data of the storage units from the first storage units having the same second state parameters into a second storage unit; and purge the data from the storage units having the same second state parameters in the storage units, except for the data in the second storage unit.

5. A method, comprising:

determining, using a processor, a first storage unit from a plurality of storage units of a memory device, wherein the determining comprises computing a parameter for each of the plurality of storage units;

generating a hash value for each of the plurality of storage units;

selecting, using a processor, at least one second storage unit from the plurality of storage units, wherein the at least one second storage unit comprises at least one storage unit, from the plurality of storage units not including the first storage unit, satisfying a first predetermined condition, wherein the first predetermined condition comprises a difference between the hash value of the respective storage unit and the hash value of the first storage unit being within a predetermined range;

transferring, using a processor, data from the first storage unit to one of the at least one second storage units when a second predetermined condition is met, wherein the second condition comprises a number of empty storage units of the first storage unit being less than a threshold value; and deleting the data from the first storage unit.

6. The method according to claim 5, further comprising acquiring second state parameters of N storage units, with the N storage units being from the storage units and like the first storage unit and satisfying the first predetermined condition.

7. The method according to claim 6, further comprising upon receiving a start command, processing the data in the first storage unit and the data in N storage units.

8. The method according to claim 6, further comprising:

acquiring the storage units having the same second state parameters from the first storage unit and N storage; and storing the data of the storage units from the storage units having the same second state parameters into a second storage unit;

purging the data from the storage units having the same second state parameters in the storage units, except for the data in the second storage unit.

9. A system, comprising:

a first acquisition unit;

an identification unit operatively coupled to the first acquisition unit;

a second acquisition unit operatively coupled to the identification unit;

a process unit operatively coupled to the second acquisition unit; and wherein:

the first acquisition unit acquires first state parameters of a plurality of storage units in a storage device;

the identification unit identifies a first storage unit from the plurality of storage units based on the first state parameters;

the second acquisition unit acquires at least one second storage unit from the plurality of storage units, that satisfies a first predetermined condition, in relation to the first storage unit from the storage unit, wherein the first predetermined condition comprises a difference between a generated hash value of the respective storage unit and a generated hash value of the first storage unit being within a predetermined range; and the process unit processes the data in the first storage unit and the data in the at least one second storage unit when a second predetermined condition is satisfied, wherein the second predetermined condition comprises a number of empty storage units of the first storage unit being less than a threshold value and wherein the processing comprises transferring data form the first storage unit to one of the at least one second storage units and deleting the data from the first storage unit.

10. The system according to claim 9, comprising acquiring second state parameters, by the processor, of N storage units, with the N storage units being at least one second storage unit and like satisfies the first predetermined condition.

11. The system according to claim 9, comprising processing the data in the first storage unit and the data in the second storage unit.

12. The system according to claim 9, further comprising:

acquiring data from the first storage units having the same second state parameters;

storing the data of the first storage units having the same second state parameters into a second storage unit; and purging the data having the same second state parameters in the storage units, except for the data in the second storage unit.

* * * * *